(12) United States Patent
Brown

(10) Patent No.: US 10,396,831 B2
(45) Date of Patent: Aug. 27, 2019

(54) APPARATUS FOR CONVERTING BROAD BAND ELECTROMAGNETIC ENERGY TO NARROW BAND ELECTROMAGNETIC ENERGY

(71) Applicant: James F. Brown, Burke, VA (US)

(72) Inventor: James F. Brown, Burke, VA (US)

(*) Notice: Subject to any disclaimer, the term of this patent is extended or adjusted under 35 U.S.C. 154(b) by 96 days.

(21) Appl. No.: 15/668,203

(22) Filed: Aug. 3, 2017

(65) Prior Publication Data

US 2019/0044552 A1     Feb. 7, 2019

(51) Int. Cl.
| | |
|---|---|
| *F21L 13/00* | (2006.01) |
| *H04B 1/00* | (2006.01) |
| *G01J 3/02* | (2006.01) |
| *H04B 17/00* | (2015.01) |
| *H04B 1/04* | (2006.01) |

(52) U.S. Cl.
CPC .......... *H04B 1/0096* (2013.01); *G01J 3/0205* (2013.01); *H04B 1/00* (2013.01); *H04B 1/0057* (2013.01); *H04B 17/00* (2013.01); *H04B 2001/0416* (2013.01)

(58) Field of Classification Search
CPC .... H04B 1/0096; H04B 17/00; H04B 1/0057; H04B 2001/0416; G01J 3/0205
See application file for complete search history.

(56) References Cited

U.S. PATENT DOCUMENTS

| | | | | |
|---|---|---|---|---|
| 4,710,631 A * | 12/1987 | Aotsuka | ................. | G03C 5/164 250/205 |
| 5,209,012 A * | 5/1993 | Palmer | ..................... | A01G 9/24 47/17 |
| 7,204,606 B2 * | 4/2007 | Brass | ..................... | G01N 21/31 362/184 |
| 7,470,921 B2 * | 12/2008 | Custer | ................... | B41J 11/002 250/492.1 |
| 8,579,463 B2 * | 11/2013 | Clough | ..................... | F21L 4/00 362/217.1 |
| 8,590,207 B1 * | 11/2013 | Shih | ........................ | A01G 9/243 47/60 |
| 9,200,770 B2 | 12/2015 | Chun | | |
| 2009/0140099 A1 * | 6/2009 | Roberts | ................. | B64D 39/00 244/135 A |

(Continued)

OTHER PUBLICATIONS

Miyamoto Kazuhisa; Renewable biological systems for alternative sustainable energy production; Agriculture and Consumer Protection, FAO Corporate Document Repository; FAO Agricultural Service Bulletin—128; section 1.2.1; 1997; http://www.fao.org/docrep/w7241e/w7241e05.htm.

(Continued)

*Primary Examiner* — Ali Alavi
(74) *Attorney, Agent, or Firm* — Kilyk & Bowersox, P.L.L.C.

(57) ABSTRACT

An apparatus and method are provided for converting broad spectrum electromagnetic energy to useful, narrow bands of electromagnetic energy. The broad spectrum electromagnetic energy may be from the Sun or from combustion, and output from the apparatus may be bands of visible light, infrared, microwaves, or a combination thereof. The apparatus can function as part of a highly efficient plant growing system or may function as part of a heating or warming system.

21 Claims, 9 Drawing Sheets

(56) References Cited

U.S. PATENT DOCUMENTS

| | | | | |
|---|---|---|---|---|
| 2011/0176137 A1* | 7/2011 | Gerigk | ................. | G06K 19/086 |
| | | | | 356/446 |
| 2011/0193491 A1* | 8/2011 | Choutov | ............ | H05B 33/0803 |
| | | | | 315/291 |
| 2012/0048322 A1* | 3/2012 | Ghoshal | ................. | H02S 10/30 |
| | | | | 136/201 |
| 2012/0306383 A1* | 12/2012 | Munro | ............... | H05B 33/0803 |
| | | | | 315/152 |
| 2013/0271974 A1* | 10/2013 | Kuhn | ....................... | F21K 9/00 |
| | | | | 362/231 |
| 2014/0077322 A1* | 3/2014 | Wertsberger | .......... | H01L 31/075 |
| | | | | 257/432 |
| 2014/0373895 A1* | 12/2014 | Yoshidomi | ............... | H02H 7/20 |
| | | | | 136/244 |
| 2015/0034144 A1* | 2/2015 | Stone | ...................... | H02S 40/22 |
| | | | | 136/246 |
| 2016/0133814 A1* | 5/2016 | Ghoshal | ................. | H01L 35/32 |
| | | | | 136/205 |
| 2018/0038158 A1* | 2/2018 | Chidiac | ................. | A01G 7/045 |

OTHER PUBLICATIONS

Nave, Carl R.; Light Absorption for Photosynthesis; Department of Physics and Astronomy; HyperPhysics; Georgia State University; 2001; http://hyperphysics.phy-astr.gsu.edu/hbase/Biology/ligabs.html.

* cited by examiner

APPARATUS FOR CONVERTING BROAD BAND ELECTROMAGNETIC ENERGY TO NARROW BAND ELECTROMAGNETIC ENERGY

FIELD OF THE INVENTION

The present invention relates to converting broad band electromagnetic energy to one or more useful, narrow bands of electromagnetic energy.

BACKGROUND OF THE INVENTION

Photosynthetic efficiency is the fraction of light energy converted into chemical energy during photosynthesis in plants. Combining energy from photosynthesis with carbon dioxide, water, and various minerals, plants can form a vast array of compounds.

For fully absorbed sunlight in the 45% of the light that is in the photosynthetically active wavelength range, the theoretical maximum efficiency of solar energy conversion is approximately 11%. Plants, however, do not absorb all incoming sunlight and do not convert all harvested energy into biomass, which brings the theoretical maximum value to around 5% or less (Renewable biological systems for alternative unsustainable energy production (http://www.fao. org/docrep/w7241e/w7241e05.htm, section 1.2.1). FAO Agricultural Services Bulletin (1997).

Even the 45% of light that can be used by plants is not utilized with equal efficiency. Only the blue and red bands of light are used with high efficiency. Bands in between are largely unused. So the actual theoretical photo efficiency of plants is around 1-2% and, in real measurements, a factor of 10 lower for some plants (http://hyperphysics.phy-astr.gsu.edu/hbase/Biology/ligabs.html). These values do not account for the energy plants often dissipate to compensate for heating effects of light they cannot use.

There is a need to provide efficient and cost effective ways to grow and prepare food and to provide light and warmth in remote locations or in power down situations.

It is desirable to supplement sunlight for growing vegetables in higher latitudes and to increase growing seasons. High Intensity Discharge (HID) lighting systems, such as Metal Halide, Ceramic Metal Halide or High-Pressure Sodium, are costly and consume large amounts of power. They also do not deliver bands of light that plants can most efficiently use, and they force plants to waste their metabolic products to shed the unusable light and heat.

There exist manufacturers of light emitting diodes (LED) grow lights for commercial and household use where a grid is up and line power is available. Many companies also manufacture photovoltaic (PV) panels or thermoelectric (TE) appliances to supply supplemental or replacement power for remote or power down situations.

Typically, high direct current voltage from the PV panel is fed into an inverter to produce 120 volts of alternating current (AC). Producers of LED grow lamps typically supply them to operate from AC line power which is then converted to LED voltages or to operate from a regulated DC voltage supply. PV panels and thermoelectric appliances, on the other hand, are usually designed to operate at full power and load at 12-volts DC but may produce over 20-volts DC when not fully loaded. Unregulated, 20-volts would destroy an LED array or series designed for 12-volts. Regulators shed and waste excess voltage and power as heat, and inverters and converters are inefficient, also wasting power as heat.

U.S. Pat. No. 9,200,770 B2 to Chun, which is incorporated herein in its entirety by reference, discloses a solar light using PV panels, batteries and LEDs for use in power down situations and in remote locations. The voltage is regulated and controlled, and the light sources, including LEDs, are selected to produce broad band white light suitable for human vision but not ideally suitable for plants.

It would be desirable and useful to power LED series and arrays directly to produce the narrow bands of light that are optimal for plants. It would be desirable to power LEDs that are optimized to provide warmth and comfort to people in remote or grid down circumstances.

SUMMARY OF THE INVENTION

The present invention takes advantage of advances in LEDs such that low sunshine or even sunless growing may be practical for ordinary produce. The present invention takes advantage of the soaring performance and plummeting prices per watt of narrow band LEDs. According to the present invention, light and sources of heat in remote locations or power down situations are provided.

BRIEF DESCRIPTION OF THE DRAWINGS

The present invention can be even more fully understood with the reference to the accompanying drawings which are intended to illustrate, not limit, the present invention.

DETAILED DESCRIPTION OF THE INVENTION

Figure 1:
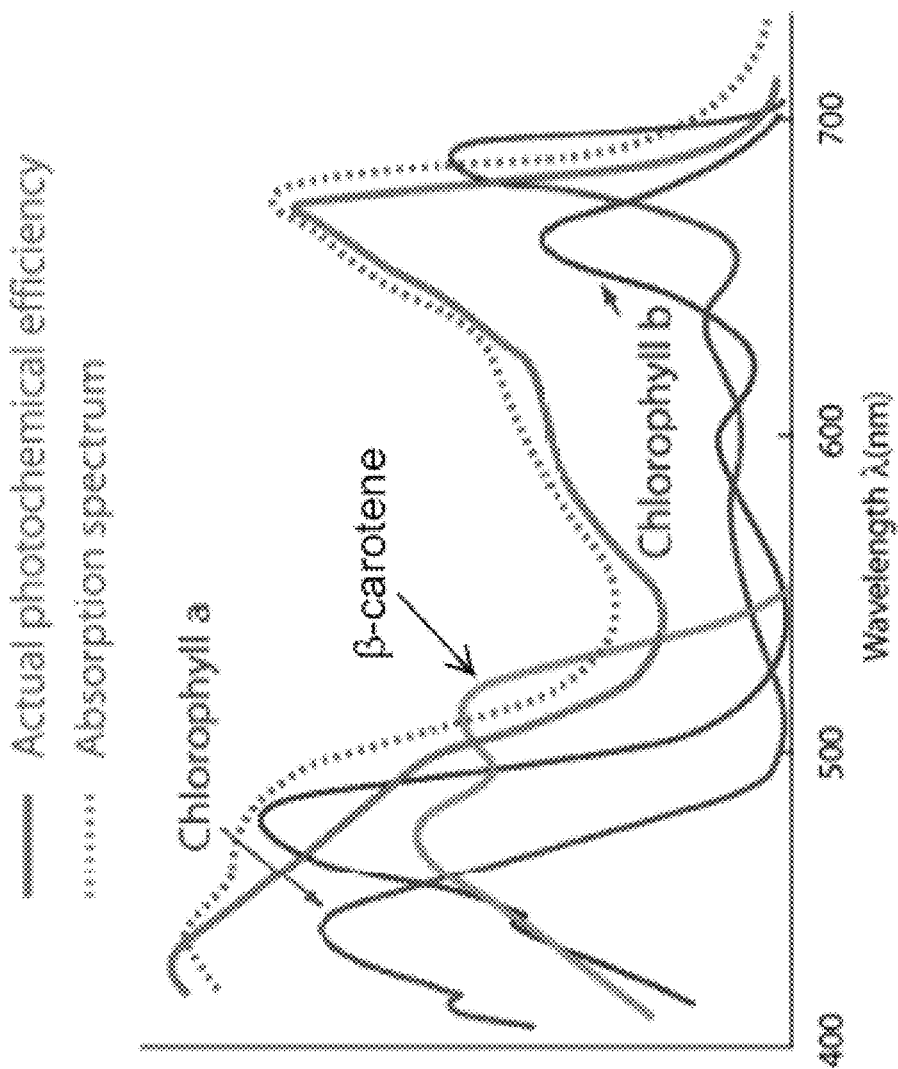
FIG. 1 is a graph showing the actual photochemical efficiency of chlorophyll a, chlorophyll b, and β-carotene, their combined actual photochemical efficiency, and the absorption spectrum that would maximize efficiency of all three compounds, all with respect to light wavelength.

According to various embodiments of the present invention, an apparatus for converting broad band electromagnetic energy from a source such as sunlight, to one or more narrow bands of electromagnetic energy, is provided. The apparatus can comprise a first device for converting broad band electromagnetic energy from a source, to electricity. The first device can have a maximum electrical power output. A second device for converting electricity to one or more narrow bands of electromagnetic energy is also provided and can have a maximum electrical power input. A connector, for example, a power cable, wire, switch, relay, regulator, inverter, converter, or combination thereof can be used for directly connecting together the first device and the second device. The connector may provide interruptions in power to the second device according to a duty cycle and frequency, or the connector may vary the allocation of power to elements of the second device. In some embodiments, the connector for directly connecting together the first device and the second device can be free of a regulator, inverter, converter, and can comprise only wire. The apparatus can further comprise an energy storage device, for example, a battery, in electrical communication with the connector, first device, the second device, or the combinations thereof. The first device can comprise a photovoltaic device, a thermoelectric device, or the like.

The second device can comprise an arrangement of electromagnetic energy emitting diodes, for example, light emitting diodes. The arrangement of electromagnetic energy emitting diodes can comprise two or more series of electromagnetic energy emitting diodes of differing threshold voltages. The two or more LEDs series of LEDs of differing or common threshold voltages can be connected in parallel. The two or more series can comprise a lower threshold voltage series having a maximum electrical power input, and a higher threshold voltage series. The lower threshold voltage series can illuminate before the higher threshold voltage series, and the higher threshold voltage series can illuminate before the lowest threshold voltage series exceeds the maximum electrical power input. The threshold voltage of the lower threshold voltage LEDs or series of LEDs can be determined by one of an electromagnetic energy emitting diode of a selected band, or by a selected number of diodes, or by a combination thereof. The LEDs or series of LEDs may comprise a red light-emitting LED having a threshold of about 1.6 volts and a maximum of about 2.1 volts, a green light-emitting LED having a threshold of about 1.9 volts and a maximum of 4.1 volts, and a blue light-emitting LED having a threshold of about 2.5 volts and a maximum of 3.8 volts. At least one of the two or more series of electromagnetic energy emitting diodes can comprise a Zener diode, a different kind of reverse-biased device, both, or the like.

The arrangement of electromagnetic energy emitting diodes can be configured to emit electromagnetic energy in one or more of the violet, blue, green, red, infrared, far-infrared, and microwave bands of the electromagnetic spectrum. The arrangement can comprise light emitting diodes (LEDs), organic light emitting diodes (OLEDs), quantum dots, combinations thereof, and the like. The arrangement of electromagnetic energy emitting diodes can be configured to emit electromagnetic energy in the blue, green, and red bands of the electromagnetic spectrum. The apparatus can further comprise a narrow band management system in operable communication with the second device and configured to control output of the one or more narrow bands of electromagnetic energy. The narrow band management system can comprise a processor, a microprocessor, a computer, a regulator, a combination thereof, or the like.

The apparatus can further comprise a plant growing system, for example, potting containers, reflecting panels, a fan, an irrigation system, pH and nutrient control systems, warming elements, troughs, raised beds, hydroponic media, soil, combinations thereof, and the like. The second device, for example, an LED lighting system, can be positioned to direct, reflect, or direct and reflect generated electromagnetic energy toward the plant growing system.

According to various embodiments of the present invention, an apparatus for converting full spectrum sunlight to narrow bands of light required to grow plants, is provided. The apparatus can comprise a photovoltaic array, an arrangement of light emitting diodes that emit light in wavelength bands required to grow plants, and a connector for directly connecting the photovoltaic device to the arrangement of light emitting diodes. The apparatus can further comprise a battery in electrical communication with the photovoltaic array, the arrangement of diodes, or both. The arrangement of light emitting diodes can be configured to emit light in one or more of the violet, blue, green, red, and infrared bands of the electromagnetic spectrum. The arrangement of light emitting diodes can be configured to emit light in the blue, green, and red bands of the electromagnetic spectrum. The arrangement of light emitting diodes can be configured to emit light in the blue and red bands of the electromagnetic spectrum. The arrangement of light emitting diodes can be configured to emit a ratio of red light to blue light of from about 20:1 to about 1:1, or from about 15:1 to about 2:1, or from about 10:1 to about 3:1, or from about 8:1 to about 4:1. The arrangement of light emitting diodes can be configured to emit light in the blue, green, and red bands of the electromagnetic spectrum but not in shorter, intermediate, or longer wavelengths. The arrangement of light emitting diodes can be integrated into a single device comprising two or more LEDs. The arrangements can consist of only blue and red LEDs. The arrangement can consist of only blue, green, and red LEDs. The apparatus can further comprise a plant growing system, wherein the arrangement of light emitting diodes is positioned to direct light toward the plant growing system.

According to yet other various embodiments of the present invention, a method of growing plants is provided, which involves converting the energy of full spectrum sunlight to narrow bands of light that are favorable to plant growth. The method can comprise illuminating a photovoltaic device, such as a photovoltaic array (PV array), with sunlight, wherein the photovoltaic device comprises an electrical output. The method can comprise directly connecting the electrical output to an arrangement of light emitting diodes so as to power the arrangement. The arrangement of light emitting diodes can provide narrow bands of light favorable to plant growth, for example, narrow bands that are sub-sets of full spectrum sunlight. The method can also comprise illuminating plants with the narrow bands of light favorable to plant growth, so produced. The photovoltaic array can have a first light absorption area, and the method can further comprise illuminating the first light absorption area with summer sunlight, and illuminating a second plant growing area that is larger than the first area, with the narrow bands of light favorable to plant growth. The second area can be, for example, at least 10% larger than the first area, at least 20% larger than the first area, at least 50% larger than the first area, at least 100% larger than the first area, at least 200% larger than the first area, or at least 500% larger than the first area. The photovoltaic array can have a first light absorption area, and the method can further comprise illuminating the first light absorption area with winter sunlight, and illuminating a growing area of about the same size as the first light absorption area, with narrow bands of light favorable to plant growth. The growing area can be, for example, at least 50% as large as the first area, at least 75% as large as first area, at least 100% as large as the first area, at least 150% larger than the first area, or at least 200% larger than the first area.

According to various embodiments of the present invention, an apparatus for converting radiant energy from combustion to narrow bands of light that are favorable to plant growth, is provided. The apparatus can comprise a thermoelectric device and an arrangement of light emitting diodes. The diodes can emit light in wavelength bands required to grow plants. A connector can be provided for directly connecting the thermoelectric device to the arrangement of light emitting diodes. The apparatus can further comprise a battery in electrical communication with the thermoelectric device. The diodes can comprise an arrangement of light emitting diodes configured to emit light in one or more of the violet, blue, green, red, and infrared bands of the electromagnetic spectrum. In some cases, the arrangement of light emitting diodes can be configured to emit light in the blue, green, and red bands of the electromagnetic spectrum. In some cases, the arrangement of light emitting diodes can be configured to emit light in the blue, green, and red bands of the electromagnetic spectrum, but not in shorter, intermediate, or longer wavelengths. The arrangements can consist of blue, green, and red LEDs. In some cases, the arrangement of light emitting diodes can be configured to emit light in the blue and red bands of the electromagnetic spectrum. The arrangement can consist of only blue and red LEDs. The arrangement of light emitting diodes can be configured to emit a ratio of red light to blue light of from about 10:1 to about 3:1 or in any of the other ratio ranges disclosed above. The apparatus can further comprise a plant growing system, wherein the arrangement of light emitting diodes is positioned to direct, reflect, or direct and reflect light toward the plant growing system.

According to various embodiments of the present invention, a method of growing plants is provided whereby radiant energy of combustion is converted to narrow bands of light that are favorable to plant growth. The method can comprise irradiating a thermoelectric device with radiant energy from combustion, wherein the thermoelectric device comprises an electrical output. The method can comprise directly connecting the electrical output to an arrangement of light emitting diodes so as to power the arrangement. The arrangement of light emitting diodes can be configured or selected to produce narrow bands of light favorable to plant growth and that are sub-sets of full spectrum sunlight. According to the method, plants are then illuminated with the narrow bands of light favorable to plant growth. The arrangement of light emitting diodes can be configured to emit light in one or more of the violet, blue, green, red, and infrared bands of the electromagnetic spectrum. The arrangement of light emitting diodes can be configured to emit light in the infrared bands of the electromagnetic spectrum, for example, in the far-infrared band, to efficiently provide warmth to persons exposed to it. The arrangement of light emitting diodes can be configured to emit light in the blue, green, and red bands of the electromagnetic spectrum. The arrangement of light emitting diodes can be configured to emit light in the blue, green, and red bands of the electromagnetic spectrum, but not in shorter, intermediate, or longer wavelengths. The arrangement of light emitting diodes can be configured to emit a ratio of red light to blue light of from about 10:1 to about 3:1 or in any of the other ratio ranges disclosed above. The plants can be arranged in a plant growing system as described herein and the arrangement of light emitting diodes can be positioned to direct the narrow bands of light toward the plant growing system.

In yet other various embodiments of the present invention, an apparatus for converting broad band radiant energy from combustion to one or more narrow bands of infrared light or microwaves, is provided. The apparatus can comprise a thermoelectric device, an arrangement of diodes comprising at least one of infrared emitting diodes and microwave emitting diodes, and a connector for directly connecting the thermoelectric device to the arrangement of diodes. The connector can be configured to enable the arrangement of diodes to be powered by the thermoelectric device. The apparatus can further comprise a battery in electrical communication with the thermoelectric device.

FIG. 1 is a graph showing the actual photochemical efficiency of chlorophyll a, chlorophyll b, and β-carotene, their combined actual photochemical efficiency, and the absorption spectrum that would maximize efficiency of all three compounds, all with respect to light wavelength. As can be discerned from FIG. 1, the energy from sunlight is largely unused by plants, while LEDs according to the present invention can provide precisely the wavelengths plants do need and can use at maximum efficiency without dissipating energy to avoid damage by heat.

A PV panel can convert the Sun's broad spectrum light at about 20% efficiency, and LEDs can convert electricity to light at 120 to 150 lumens per watt, which is almost three times more efficient than compact fluorescent lights and up to eight times more efficient than that of incandescent lights. According to the present invention, and even allowing for the inefficiency of PV panels, the combination of a PV array having a given area with narrow band LEDs can produce over ten times more light that is useful to plants than the same given area of sunlight.

These broad band-to-narrow band relationships can work in two continuously interrelated ways. In bright summer sunlight, a PV panel and LEDs can produce ten times the growing area of direct sunlight on the panel area. Or, in dim winter sunlight, a PV panel and LEDs can illuminate the same panel area with narrow band light that is ten times brighter than winter sunlight that is useful to plants. In winter sunlight at mid to high latitudes, the PV-LED combination can more than compensate for the plant-usable low solar flux, allowing summer vegetables to be grown in winter. In summer, an area of PV cells can grow a much larger area of plants than direct sunshine, especially benefiting those who have limited access to full Sun.

This non-intuitive view is only economically feasible because of the amazing progress in the power and efficiency of PV, TE, and LED technology.

Without a sufficient load, both PV and TE devices produce voltages almost twice their loaded voltage. A PV or TE device capable of delivering 24 watts of power at 12-volts DC under load will destroy a 10 watt, 12-volt LED with over 20 volts. However, PV and TE devices have outputs that are dependent on inputs of light or heat, respectively. The Sun comes up slowly on a PV panel as does the voltage and available power. The same could be said for a TE device, as the thermal energy increases from a combustion process or a friction or possibly molten geothermal source.

Managing this over voltage, over power situation, without wasting valuable power as heat, can be accomplished by various embodiments of the present invention.

In one or more embodiments, the present invention provides advantages from the discovery that LEDs of various colors have single and different LED threshold voltages, such that one color can control the current running through a series of LEDs. For example, a blue LED in a series comprising a plurality of red LEDs will prevent current from flowing through the entire series until the voltage drop across the blue LED exceeds a voltage of just below 3-volts, herein, also referred to as about 3 volts. Meanwhile, the red LEDs will only light up, that is, become activated, if the blue LED in the series is activated. This is true even though the voltage drop across one red LED only needs to exceed a voltage of about 1.6-volts to become activated. Thus, the blue LED in such a series controls the entire series. Although a PV array may generate enough voltage to power a series of red LEDs, it may be more efficient to use the PV array to store or divert energy and not power the red LEDs until one or more blue LEDs can also be powered. In such a scenario a broader spectrum comprising two different narrow bands of irradiation can illuminate a plant-growing area and the PV array can be provided with a longer period of time to convert and store solar energy as stored electricity. Or the solar energy may be diverted to a group of LEDs having a lower threshold than the blue LED(s). Accordingly, a blue LED or a group of blue LEDs, can be included in a series of red LEDs so that the red LEDs will not produce light, that is, become activated, before the blue LED or before the group of blue LEDs becomes activated.

Plants that more efficiently photosynthesize when exposed to light in certain wavelengths can be efficiently grown by tailoring the construction of one or more series of LEDs. The tailoring can include calculating the best combination of percentages of red, blue, and green LEDs and the best distributions of those LEDs along the series.

Combinations of series and parallel circuits can be made and used to provide various goals. A parallel circuit can have two, or more, series of LEDs connected thereto and branching off such that both series receive voltage simultaneously through the parallel circuit. Differences in the two series branching off of the parallel circuit can determine which of the two series becomes activated first and what combinations of wavelengths are emitted from each series. In an example, one series branching off of a parallel circuit can consist of 20 red LEDs while the other series can consist of 20 blue LEDs. At first, for example, in the early morning when very little voltage is generated by the PV array, only the series of red LEDs might become activated while the series of blue LEDs would not become activated. The series of blue LEDs, that requires a greater voltage to become activated compared to the series of red LEDs, might not become activated until the PV array generates enough voltage (e.g., about three volts) from the mid-day sun to activate the blue LEDs. For a plant species that thrives on more red light compared to blue light, such a system might be ideal. Also, in very low incident-light conditions, such as during evening hours or under cloudy conditions, wherein the PV array generates only enough voltage to activate red LEDs but does not generate enough voltage to activate blue LEDs, at least some red light can be cast on a plant growing area as opposed to no light at all. On the other hand, to prevent such an uneven distribution of wavelengths throughout the day, one or more blue LEDs can be incorporated into an otherwise red LED series to control activation of the series until the blue LED is activated. In other embodiments, two or more identical series of LEDs can be used, branching off of a parallel circuit.

The cascading activation of different LED series can also be controlled by using different numbers of the same LEDs in the different series. A series having a certain number of LEDs of the same color will pass current and become activated before a series of the same color but having a larger number of LEDs. In some embodiments, one or more series of LEDs, for example, having 20 LEDs each, can be arranged above and directed toward the periphery of a growing area, whereas one or more longer series of LEDs, for example, having 40 LEDs each, can be arranged directly above and directed toward the center of the growing area. In such an example, early morning and late-day sun may provide the PV array with sufficient energy to produce voltage to activate the shorter series of LEDs while the mid-day sun can provide enough energy for the PV array to produce enough voltage to activate the longer series of LEDs. As such, plants at or near the periphery of the growing area can receive light from short LED series for a longer period of each day but plants in the middle of the growing area can receive more powerful light, from longer series of LEDs, albeit for a shorter period of each day.

In still another embodiment, a Zener diode or other reverse biased device, having a selected reverse voltage, and in series with LEDs, will not pass current, illuminate the LEDs, and consume power, until the voltage drop across the Zener or other reverse biased device exceeds that bias. Once the Zener threshold is reached, their resistance is low, producing little heat.

A surprising benefit of this discovery is that one series of LEDs, having a combined voltage drop, can be almost fully illuminated before another series in parallel, having a higher combined voltage drop, begins to pass current, illuminate the series, and prevent the first series from being destroyed by over voltage. This arrangement provides more light at lower voltages than a single series matched to the full power of the PV or TE device. The cascade of illumination from one series to the next as the voltage and power rise provides a better power to illumination curve than a matched series. Plants can also benefit from increased red light at low power and elevated levels of blue light at full power.

Figure 2:
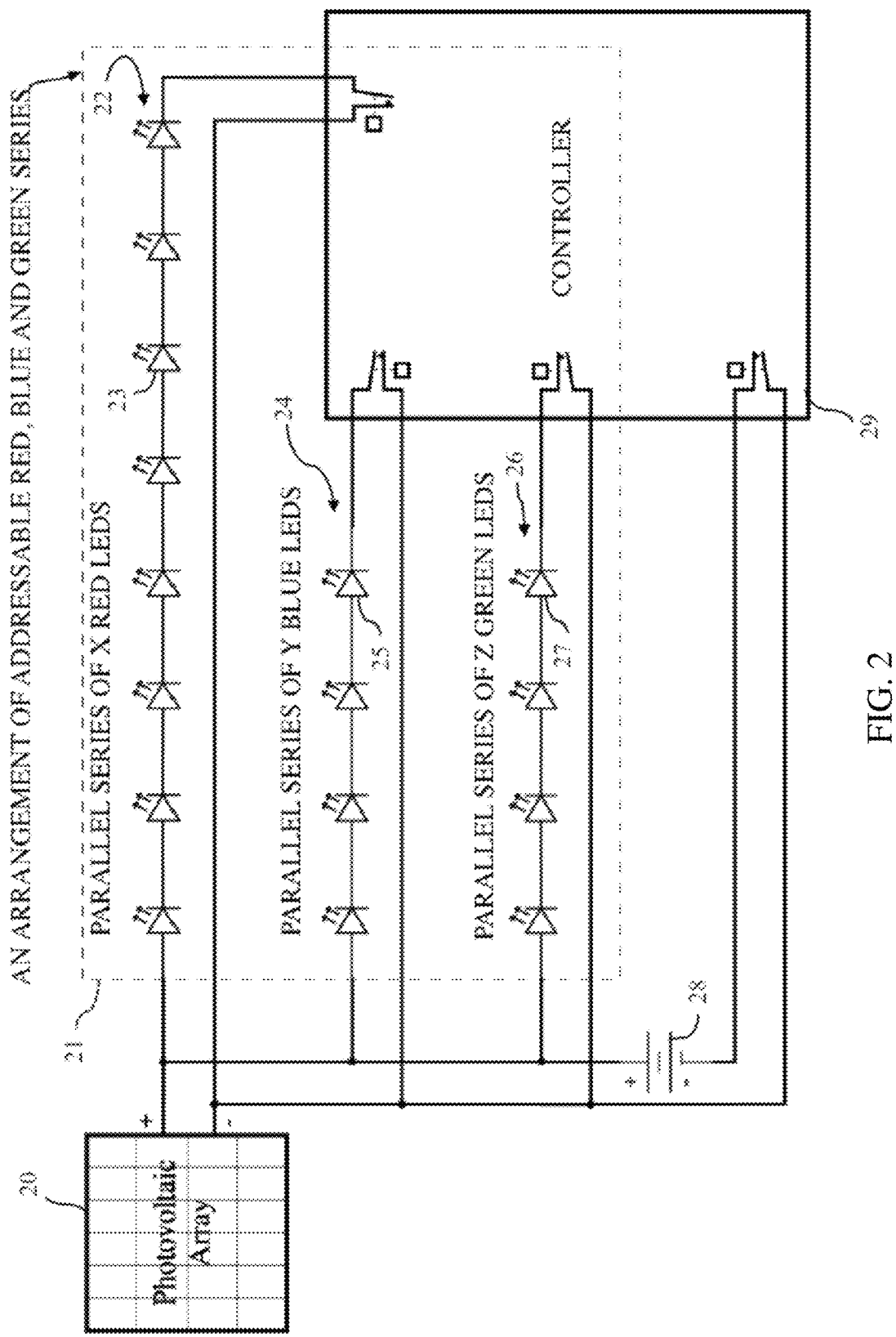
FIG. 2 is a circuit diagram of a solar-powered LED lighting system for growing plants, according to an embodiment of the present invention.
Figure 3:
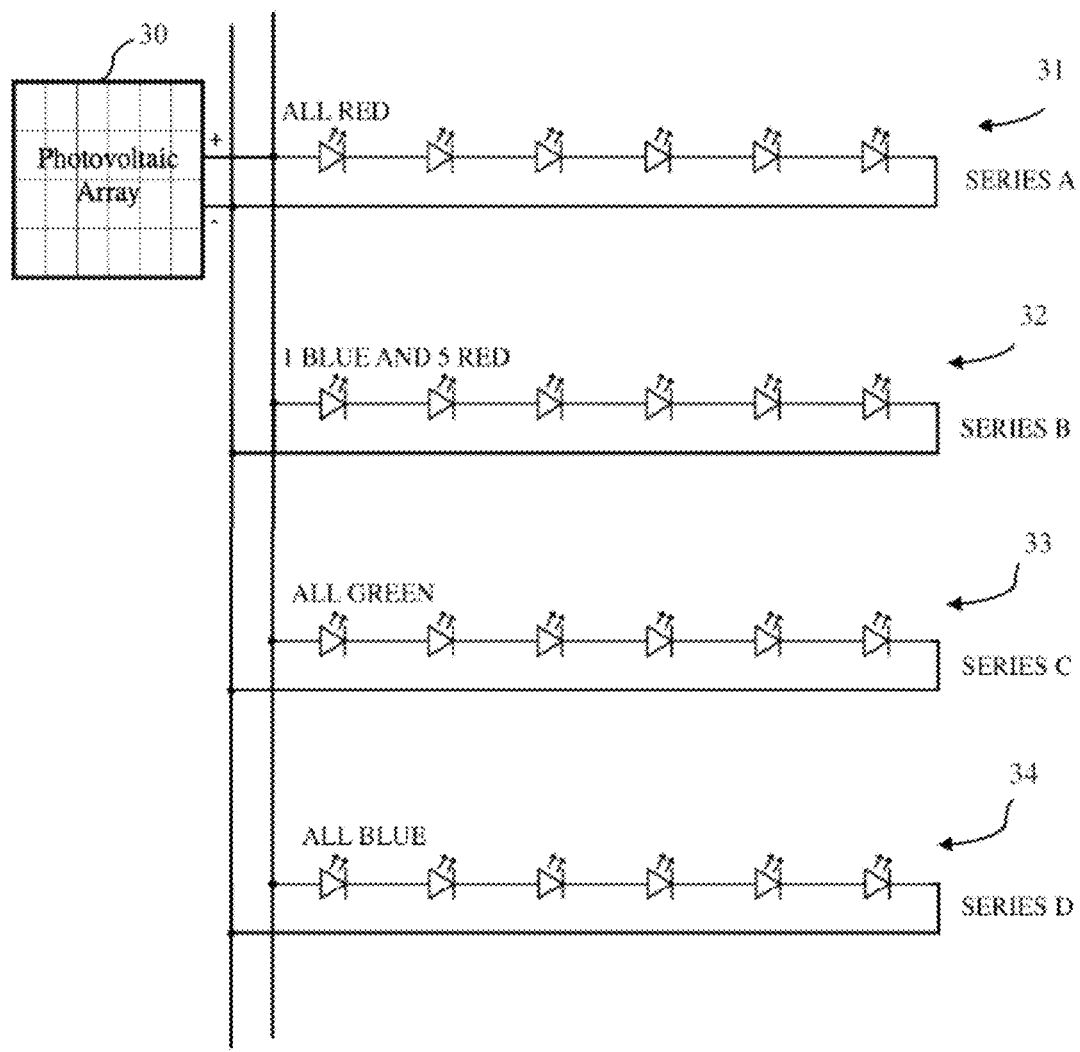
FIG. 3 is a circuit diagram of a solar-powered LED lighting system for growing plants, according to another embodiment of the present invention.
Figure 4:
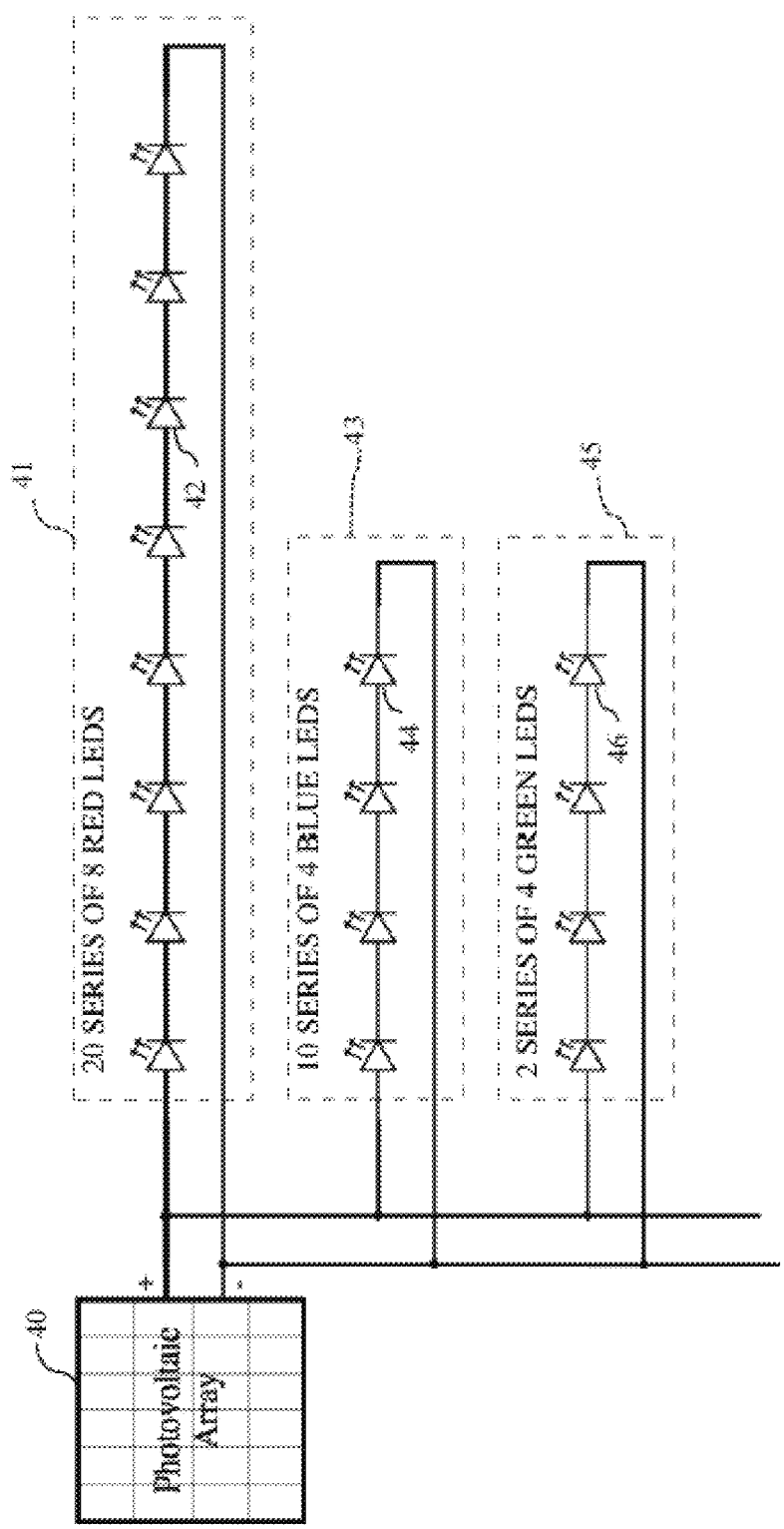
FIG. 4 is a circuit diagram of a solar-powered LED lighting system for growing plants, according to another embodiment of the present invention.

FIGS. 2-4 are circuit diagrams of solar-powered LED lighting systems for growing plants, according to various embodiments of the present invention. FIG. 2 shows a system comprising a photovoltaic array 20, an arrangement of addressable LED series 21, a parallel series 22 of X number of red LEDs 23, a parallel series 24 of Y number of blue LEDs 25, a parallel series 26 of Z number of green LEDs 27, a battery 28, and a controller 29 that can comprise, for example, a circuit board, central processing unit, and the like.

FIG. 3 shows a system comprising a photovoltaic array 30, a parallel series 31 of red LEDs, a parallel series 32 of one blue and five red LEDs, a parallel series 33 of green LEDs, a series 34 of blue LEDs, and circuit lines connecting the photovoltaic array to the series and that can lead to a controller.

FIG. 4 shows a system comprising a photovoltaic array 40, group 41 of 20 series of eight red LEDs 42, a group 43 of ten series of four blue LEDs 44, a group 45 of two series of four green LEDs 46, and circuit lines connecting the photovoltaic array to the series and that can lead to a controller.

Figure 5:
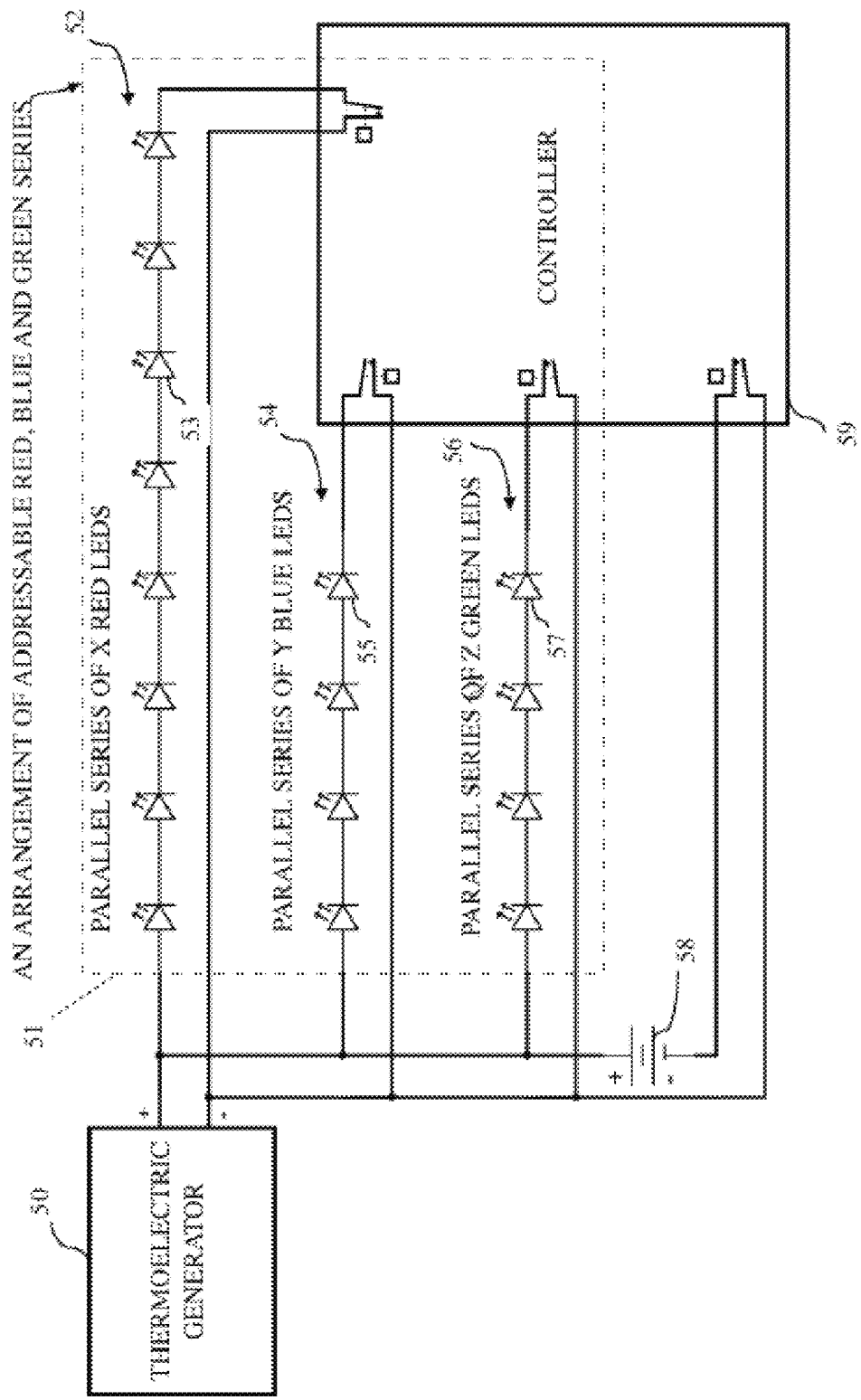
FIG. 5 is a circuit diagram of a thermoelectric generator-powered LED lighting system for growing plants, according to another embodiment of the present invention.
Figure 6A:
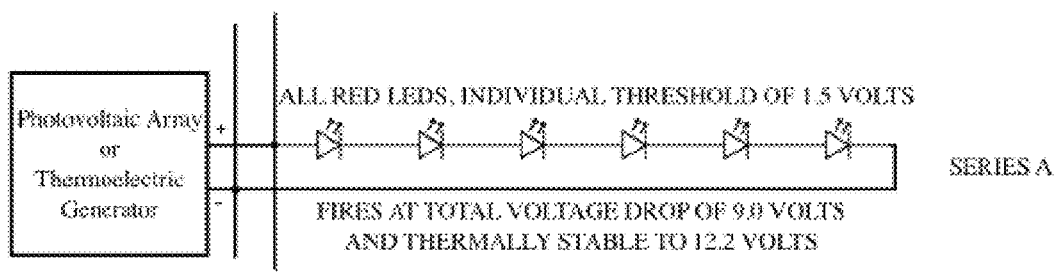
FIGS. 6A-6E are schematic diagrams of respective LED lighting systems according to various embodiments of the present invention.
Figure 6B:
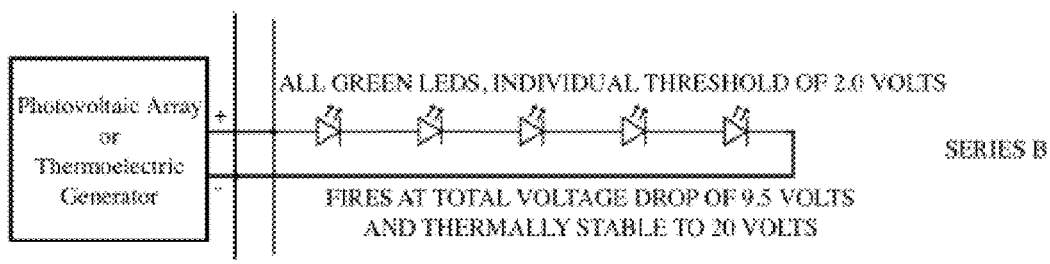
Figure 6C:
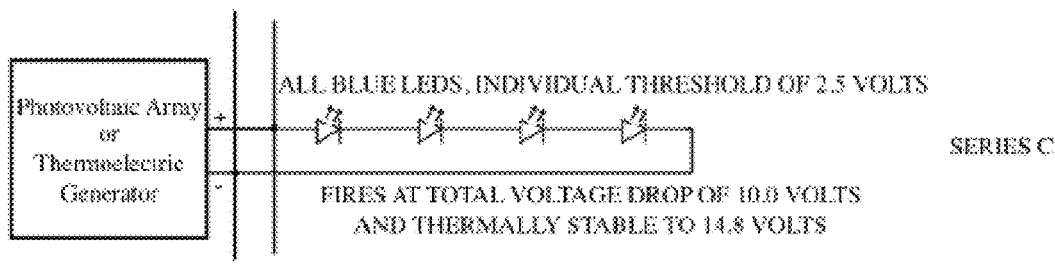
Figure 6D:
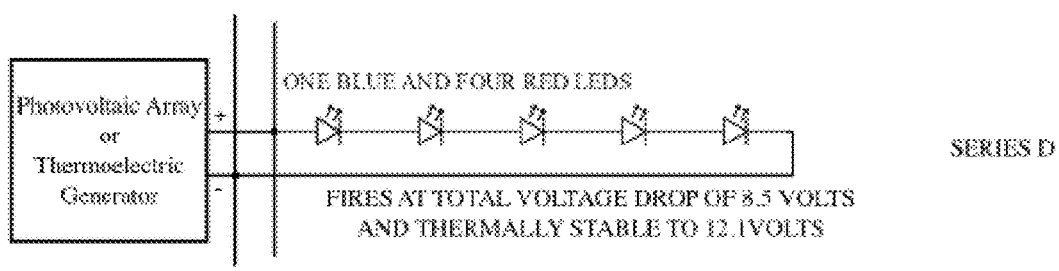
Figure 6E:
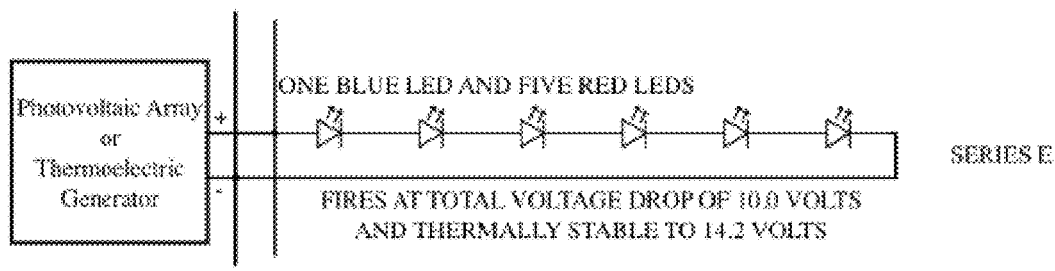

FIG. 5 is a circuit diagram of a thermoelectric generator-powered LED lighting system for growing plants, according to another embodiment of the present invention. FIG. 5 shows a system comprising a thermoelectric generator 50, an arrangement of addressable LED series 51, a parallel series 52 of X number of red LEDs 53, a parallel series 54 of Y number of blue LEDs 55, a parallel series 56 of Z number of green LEDs 57, a battery 58, and a controller 59 that can comprise, for example, a circuit board, central processing unit, and the like.

FIGS. 6A-6E are schematic diagrams of other respective LED lighting systems according to various embodiments of the present invention.

Figure 7:
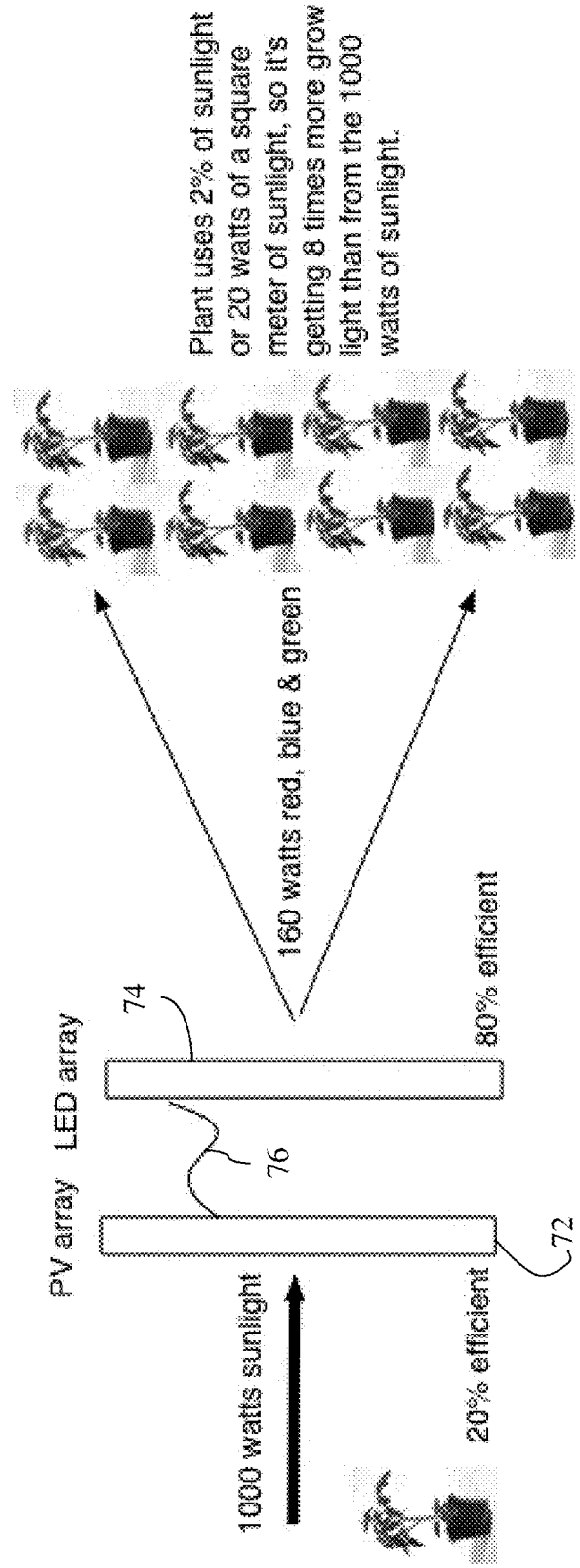
FIG. 7 is a schematic diagram of a solar-powered LED lighting system according to an embodiment of the present invention and comprising a plant-growing area, an LED array, a photovoltaic array (PV array), and the relative energy use efficiencies of the various components.
Figure 8:
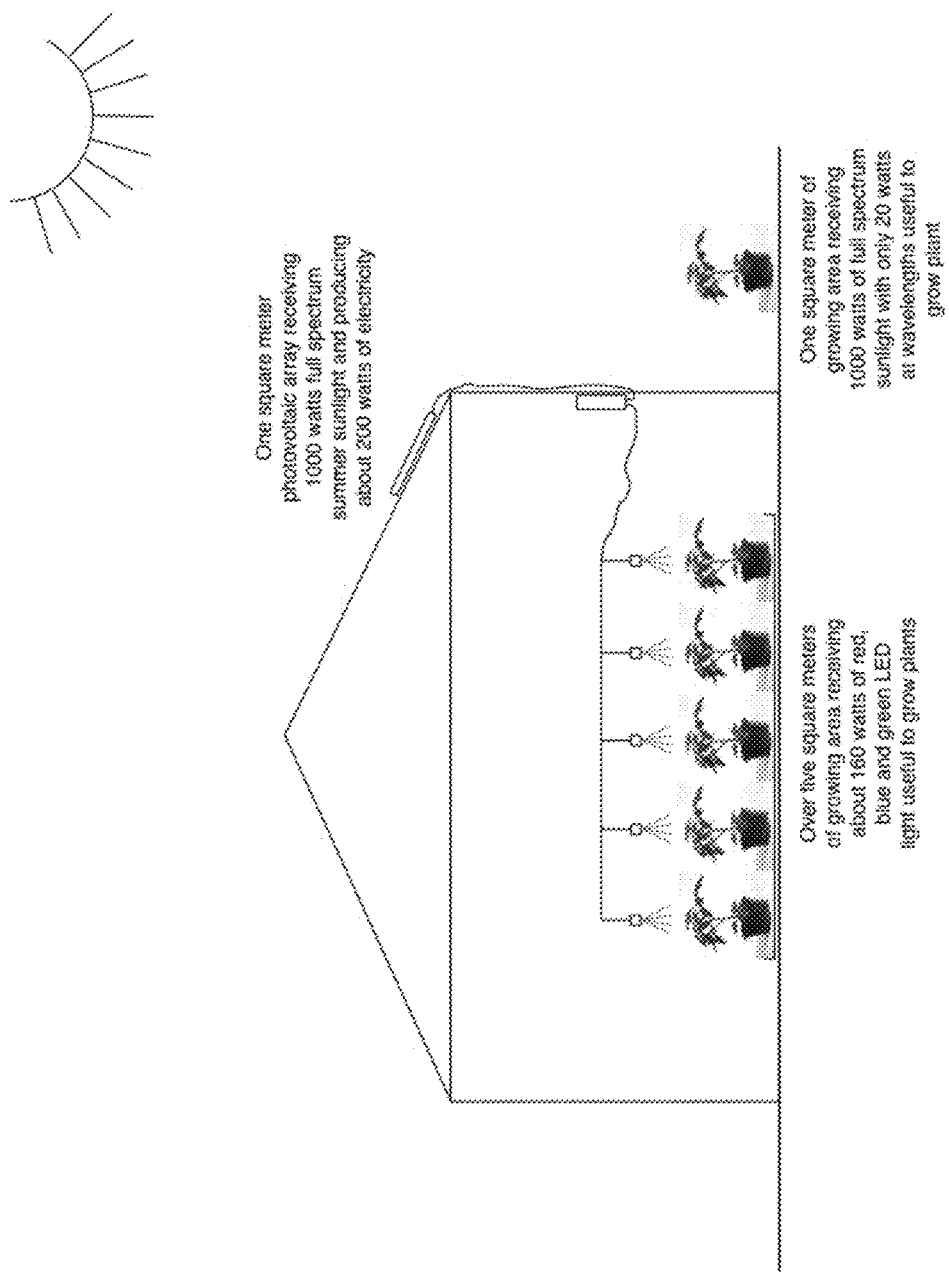
FIG. 8 is a schematic diagram of a solar-powered LED lighting system according to an embodiment of the present invention and explains how the system is used to efficiently grow plants during summer seasons.
Figure 9:
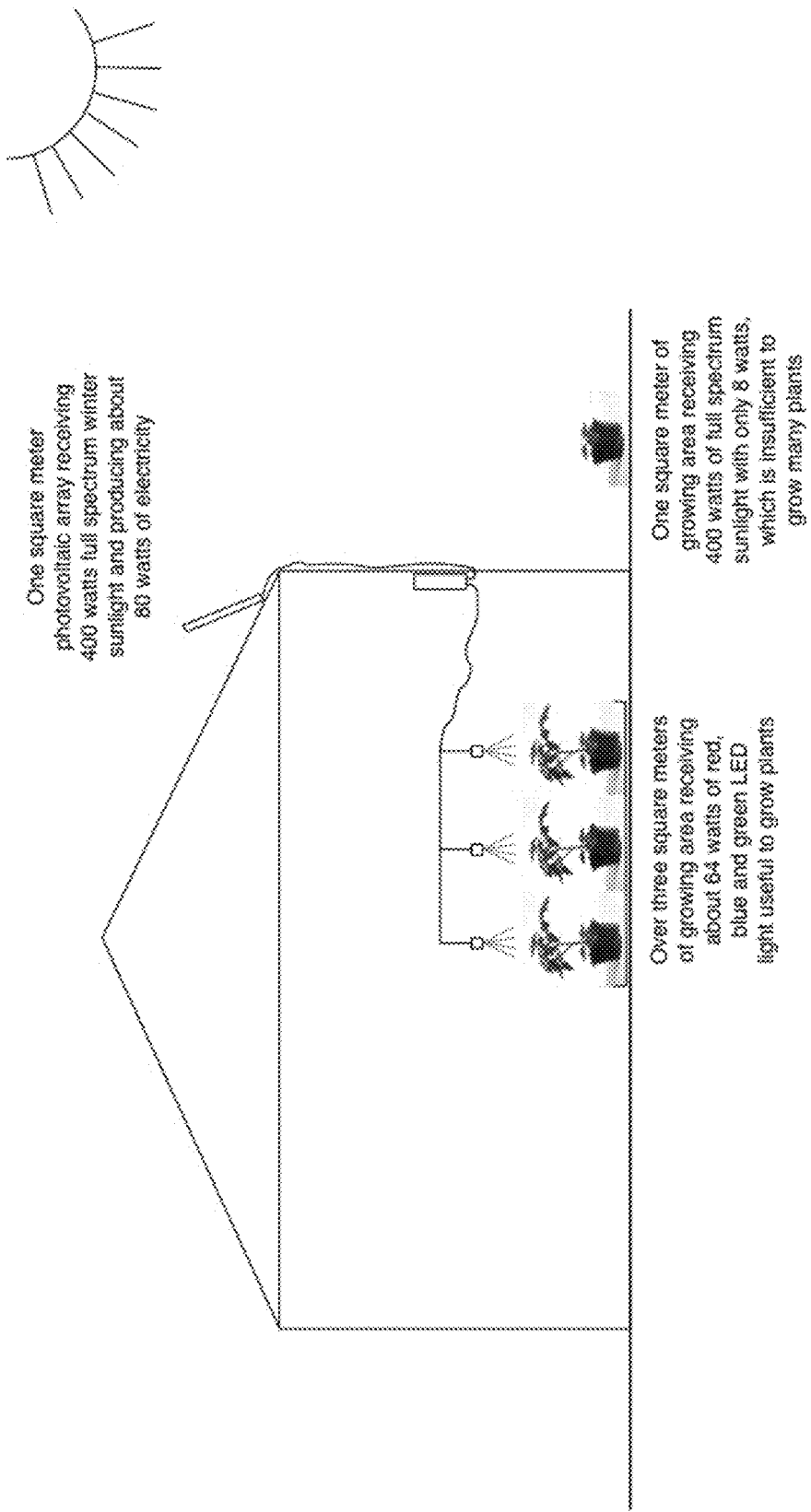
FIG. 9 is a schematic diagram of a solar-powered LED lighting system according to an embodiment of the present invention and explains how the system is used to efficiently grow plants during winter seasons.

Other systems according to the present teachings are shown schematically in FIGS. 7-9. FIG. 7 is a schematic diagram of a solar-powered LED lighting system according to an embodiment of the present invention and comprising a plant-growing area, an LED array 74, and a photovoltaic array 72 (PV array). FIG. 7 demonstrates the relative energy use efficiencies of the various components. PV array 72 and LED array 74 are in electrical connection with each other through an electrical wire or trace 76. For a system, as shown, that receives 1000 watts of incident light on a one square meter PV array that is 20% efficient, and that powers an LED array that is 80% efficient, 160 watts of red, blue, and green light can be generated. Assuming that tomato plants use only 2% of incident sunlight or 20 watts of a square meter of summer, mid-day sunlight, the system provides eight times more useful growing light than 1000 watts of incident, summer, mid-day sunlight.

FIG. 8 is a schematic diagram of a solar-powered LED lighting system according to an embodiment of the present invention, for use during summer seasons. FIG. 8 explains how the system is used to efficiently grow plants during summer seasons. A roof-top PV array of one square meter, which is 20% efficient, receives 1000 watts of summer, mid-day, full-spectrum sunlight and produces 200 watts of power. By using an LED array that is 80% efficient and that consists of red, blue, and green LEDs, 160 watts of light useful to grow plants can be spread over five square meters with each square meter receiving about 32 watts of useful, plant-growing wavelengths. When compared with natural sunlight, and given that most plants use only 2% of full-spectrum sunlight such that one square meter of growing area would only receive 20 watts of useful, natural, plant-growing wavelengths, it can be seen that the system of the present invention is much more efficient at growing plants in the summer, compared with natural sunlight.

FIG. 9 is a schematic diagram of a solar-powered LED lighting system according to an embodiment of the present invention, for use during winter seasons. FIG. 9 explains how the system is used to efficiently grow plants during winter seasons. A roof-top PV array of one square meter that is 20% efficient receives 400 watts of winter, mid-day, full-spectrum sunlight and produces 80 watts of power. By using an LED array that is 80% efficient and that consists of red, blue, and green LEDs, 64 watts of light useful to grow plants can be spread over three square meters with each square meter receiving about 21 watts of useful, plant-growing wavelengths. When compared with natural sunlight, and given that most plants use only 2% of full-spectrum sunlight such that one square meter of growing area would only receive 8 watts of useful, natural, plant-growing wavelengths, it can be seen that the system of the present invention is more efficient at growing plants during the winter, compared with natural sunlight.

Electromagnetic energy emitting diodes span the spectrum now from microwaves to ultra violet, and the power and cost are always improving. In yet another embodiment of the present invention, food preparation is efficiently made possible with infrared or microwave diodes.

In still another embodiment, actual warming of people is effected by far infrared or near microwave diodes without heating the space around the people. In such an embodiment, the heating is similar to being in the presence of a fireplace or wood stove in a cool room.

The present invention includes the following numbered aspects, embodiments, and features, in any order and/or in any combination:

1. An apparatus for converting broad band electromagnetic energy from a source to one or more narrow bands of electromagnetic energy, the apparatus comprising: a first device for converting broad band electromagnetic energy from a source to electricity, the first device having a maximum electrical power output; a second device for converting electricity to one or more narrow bands of electromagnetic energy, having a maximum electrical power input; and a connector for directly connecting together the first device and the second device.

2. The apparatus of any preceding or following embodiment/feature/aspect, wherein the connector for directly connecting together the first device and the second device is free of a regulator, inverter, and converter.

3. The apparatus of any preceding or following embodiment/feature/aspect, further comprising an energy storage device in electrical communication with the first device.

4. The apparatus of any preceding or following embodiment/feature/aspect, wherein the first device comprises a photovoltaic device or a thermoelectric device.

5. The apparatus of any preceding or following embodiment/feature/aspect, wherein the second device comprises an arrangement of electromagnetic energy emitting diodes.

6. The apparatus of any preceding or following embodiment/feature/aspect, wherein the electromagnetic energy emitting diodes comprise light emitting diodes.

7. The apparatus of any preceding or following embodiment/feature/aspect, wherein the arrangement of electromagnetic energy emitting diodes comprises two or more diodes series of electromagnetic energy emitting diodes of differing threshold voltages, connected in parallel, the two or more diodes or series comprising a lower threshold voltage series having a maximum electrical power input, and a highest threshold voltage series, wherein the lower threshold voltage series illuminates before the highest threshold voltage series, and the highest threshold voltage series illuminates before the lowest threshold voltage series exceeds the maximum electrical power input.

8. The apparatus of any preceding or following embodiment/feature/aspect, wherein a threshold voltage of the lower threshold voltage series is determined by one of an electromagnetic energy emitting diode of a selected band, and a selected number of diodes.

9. The apparatus of any preceding or following embodiment/feature/aspect, wherein at least one of the two or more series of electromagnetic energy emitting diodes comprises a Zener diode, a reverse-biased device, or both.

10. The apparatus of any preceding or following embodiment/feature/aspect, wherein the arrangement of electromagnetic energy emitting diodes is configured to emit electromagnetic energy in one or more of the violet, blue, green, red, infrared, and microwave bands of the electromagnetic spectrum.

11. The apparatus of any preceding or following embodiment/feature/aspect, wherein the arrangement of electromagnetic energy emitting diodes is configured to emit electromagnetic energy in the blue, green, and red bands of the electromagnetic spectrum.

12. The apparatus of any preceding or following embodiment/feature/aspect, further comprising a narrow band management system in operable communication with the second device and configured to control output of the one or more narrow bands of electromagnetic energy.

13. The apparatus of any preceding or following embodiment/feature/aspect, wherein the narrow band management system comprises a computer.

14. The apparatus of any preceding or following embodiment/feature/aspect, further comprising a plant growing system, wherein the second device is positioned to direct generated electromagnetic energy toward the plant growing system.

15. An apparatus for converting full spectrum sunlight to narrow bands of light required to grow plants, the apparatus comprising: a photovoltaic array; an arrangement of light emitting diodes that emit light in wavelength bands required to grow plants; and a connector for directly connecting the photovoltaic device to the arrangement of light emitting diodes.

16. The apparatus of any preceding or following embodiment/feature/aspect, further comprising a battery in electrical communication with the photovoltaic array.

17. The apparatus of any preceding or following embodiment/feature/aspect, wherein the arrangement of light emitting diodes is configured to emit light in one or more of the violet, blue, green, red, and infrared bands of the electromagnetic spectrum.

18. The apparatus of any preceding or following embodiment/feature/aspect, wherein the arrangement of light emitting diodes is configured to emit light in the blue, green, and red bands of the electromagnetic spectrum, but not in shorter or longer wavelengths.

19. The apparatus of any preceding or following embodiment/feature/aspect, further comprising a plant growing system, wherein the arrangement of light emitting diodes is positioned to direct light toward the plant growing system.

20. A method of growing plants by converting the energy of full spectrum sunlight to narrow bands of light that are favorable to plant growth, the method comprising:

illuminating a photovoltaic device with sunlight, the photovoltaic device comprising an electrical output;

directly connecting the electrical output to an arrangement of light emitting diodes to power the arrangement, the arrangement of light emitting diodes providing narrow bands of light favorable to plant growth and that are sub-sets of the full spectrum sunlight; and illuminating plants with the narrow bands of light favorable to plant growth.

21. The method of any preceding or following embodiment/feature/aspect, wherein the photovoltaic array has a first light absorption area, and the method further comprises:

illuminating the first light absorption area with summer sunlight; and illuminating a second area that is at least 10% larger than the first area, with the narrow bands of light favorable to plant growth.

22. The method of any preceding or following embodiment/feature/aspect, wherein the photovoltaic array has a first light absorption area, and the method further comprises:

illuminating the first light absorption area with winter sunlight; and illuminating a growing area of the same size as the first light absorption area, with the narrow bands of light favorable to plant growth.

23. An apparatus for converting radiant energy from combustion to narrow bands of light that are favorable to plant growth, the apparatus comprising: a thermoelectric device; an arrangement of light emitting diodes that emit light in wavelength bands required to grow plants; and a connector for directly connecting the thermoelectric device to the arrangement of light emitting diodes.

24. The apparatus of any preceding or following embodiment/feature/aspect, further comprising a battery in electrical communication with the thermoelectric device.

25. The apparatus of any preceding or following embodiment/feature/aspect, wherein the arrangement of light emitting diodes is configured to emit light in one or more of the violet, blue, green, red, and infrared bands of the electromagnetic spectrum.

26. The apparatus of any preceding or following embodiment/feature/aspect, wherein the arrangement of light emitting diodes is configured to emit light in the blue, green, and red bands of the electromagnetic spectrum, but not in shorter or longer wavelengths.

27. The apparatus of any preceding or following embodiment/feature/aspect, further comprising a plant growing system, wherein the arrangement of light emitting diodes is positioned to direct light toward the plant growing system.

28. A method of growing plants by converting radiant energy of combustion to narrow bands of light that are favorable to plant growth, the method comprising:

irradiating a thermoelectric device with radiant energy from combustion, the thermoelectric device comprising an electrical output;

directly connecting the electrical output to an arrangement of light emitting diodes to power the arrangement, the arrangement of light emitting diodes producing narrow bands of light favorable to plant growth and that are sub-sets of full spectrum sunlight; and illuminating plants with the narrow bands of light favorable to plant growth.

29. The method of any preceding or following embodiment/feature/aspect, wherein the arrangement of light emitting diodes is configured to emit light in one or more of the violet, blue, green, red, and infrared bands of the electromagnetic spectrum.

30. The method of any preceding or following embodiment/feature/aspect, wherein the arrangement of light emitting diodes is configured to emit light in the blue, green, and red bands of the electromagnetic spectrum, but not in shorter or longer wavelengths.

31. The method of any preceding or following embodiment/feature/aspect, wherein the plants are arranged in a plant growing system and the arrangement of light emitting diodes is positioned to direct the narrow bands of light toward the plant growing system.

32. An apparatus for converting broad band radiant energy from combustion to one or more narrow bands of infrared light or microwaves, the apparatus comprising: a thermoelectric device; an arrangement of diodes comprising at least one of infrared emitting diodes and microwave emitting diodes; and a connector for directly connecting the thermoelectric device to the arrangement of diodes and for powering the arrangement of diodes with the thermoelectric device.

33. The apparatus of any preceding embodiment/feature/aspect, further comprising a battery in electrical communication with the thermoelectric device.

The present invention can include any combination of these various embodiments, features, and aspects above as set forth in the numbered sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only, with a true scope and spirit of the invention being indicated by the following claims and equivalents thereof.

What is claimed is:

1. An apparatus for converting full spectrum sunlight, broad band, electromagnetic energy from a source to one or more narrow bands of electromagnetic energy, the apparatus comprising: a first device for converting broad band electromagnetic energy from a source, to electricity, the first device having a maximum electrical power output; a second device for converting electricity to one or more narrow bands of electromagnetic energy, having a maximum electrical power input; and a connector for directly connecting together the first device and the second device.

2. The apparatus of claim 1, further comprising a plant growing system, wherein the second device is positioned to direct generated electromagnetic energy toward the plant growing system.

3. The apparatus of claim 1, further comprising an energy storage device in electrical communication with the first device, the second device, the connector, or combinations thereof.

4. The apparatus of claim 1, wherein the first device comprises a photovoltaic device or a thermoelectric device.

5. The apparatus of claim 1, further comprising a narrow band management system in operable communication with the second device and configured to control output of the one or more narrow bands of electromagnetic energy.

6. The apparatus of claim 5, wherein the narrow band management system comprises a computer.

7. An apparatus for converting broad band electromagnetic energy from a source to one or more narrow bands of electromagnetic energy, the apparatus comprising: a first device for converting broad band electromagnetic energy from a source to electricity, the first device having a maximum electrical power output; a second device for converting electricity to one or more narrow bands of electromagnetic energy, having a maximum electrical power input; and a connector for directly connecting together the first device and the second device, wherein the second device comprises an arrangement of electromagnetic energy emitting diodes, wherein the arrangement of electromagnetic energy emitting diodes comprises two or more series of electromagnetic energy emitting diodes of differing threshold voltages, connected in parallel, the two or more series comprising a lower threshold voltage series having a maximum electrical power input, and a highest threshold voltage series, wherein the lower threshold voltage series illuminates before the highest threshold voltage series, and the highest threshold voltage series illuminates before the lowest threshold voltage series exceeds the maximum electrical power input.

8. The apparatus of claim 7, wherein a threshold voltage of the lower threshold voltage series is determined by one of an electromagnetic energy emitting diode of a selected band, and a selected number of diodes.

9. The apparatus of claim 7, wherein at least one of the two or more series of electromagnetic energy emitting diodes comprises a Zener diode, a reverse-biased device, or both.

10. The apparatus of claim 7, wherein the arrangement of electromagnetic energy emitting diodes is configured to emit electromagnetic energy in one or more of the violet, blue, green, red, infrared, and microwave bands of the electromagnetic spectrum.

11. The apparatus of claim 7, wherein the arrangement of electromagnetic energy emitting diodes is configured to emit electromagnetic energy in the blue, green, and red bands of the electromagnetic spectrum.

12. The apparatus of claim 7, wherein the electromagnetic energy emitting diodes comprise light emitting diodes.

13. An apparatus for converting broad band electromagnetic energy from a source to one or more narrow bands of electromagnetic energy, the apparatus comprising: a first device for converting broad band electromagnetic energy from a source to electricity, the first device having a maximum electrical power output; a second device for converting electricity to one or more narrow bands of electromagnetic energy, having a maximum electrical power input; and a connector for directly connecting together the first device and the second device, wherein the connector for directly connecting together the first device and the second device is free of a regulator, inverter, and converter.

14. An apparatus for converting full spectrum sunlight to narrow bands of light required to grow plants, the apparatus comprising: a photovoltaic array; an arrangement of light emitting diodes that emit light in wavelength bands required to grow plants; and a connector for directly connecting the photovoltaic device to the arrangement of light emitting diodes.

15. The apparatus of claim 14, further comprising a plant growing system, wherein the arrangement of light emitting diodes is positioned to direct light toward the plant growing system.

16. The apparatus of claim 14, further comprising a battery in electrical communication with the photovoltaic array.

17. The apparatus of claim 14, wherein the arrangement of light emitting diodes is configured to emit light in one or more of the violet, blue, green, red, and infrared bands of the electromagnetic spectrum.

18. The apparatus of claim 14, wherein the arrangement of light emitting diodes is configured to emit light in the blue, green, and red bands of the electromagnetic spectrum, but not in shorter or longer wavelengths.

19. A method of growing plants by converting the energy of full spectrum sunlight to narrow bands of light that are favorable to plant growth, the method comprising:
   illuminating a photovoltaic device with full spectrum sunlight, the photovoltaic device comprising an electrical output;
   directly connecting the electrical output to an arrangement of light emitting diodes to power the arrangement, the arrangement of light emitting diodes providing narrow bands of light favorable to plant growth and that are sub-sets of the full spectrum sunlight; and
   illuminating plants with the narrow bands of light favorable to plant growth.

20. The method of claim 19, wherein the photovoltaic array has a first light absorption area, and the method further comprises:

illuminating the first light absorption area with summer sunlight; and illuminating a second area that is at least 10% larger than the first area, with the narrow bands of light favorable to plant growth.

21. The method of claim 19, wherein the photovoltaic array has a first light absorption area, and the method further comprises:

illuminating the first light absorption area with winter sunlight; and illuminating a growing area of the same size as the first light absorption area, with the narrow bands of light favorable to plant growth.

* * * * *